United States Patent [19]
Schmidt et al.

[11] 3,856,416
[45] Dec. 24, 1974

[54] LIGHT METER WITH NUCLEAR LIGHT SOURCE

[75] Inventors: Ewald Schmidt, Braunfels; Willi Wiessner, Wetzlar, both of Germany

[73] Assignee: Ernst Leitz G.m.b.H., Wetzlar, Germany

[22] Filed: Sept. 12, 1972

[21] Appl. No.: 288,375

[30] Foreign Application Priority Data
Sept. 27, 1971 Germany............................ 2148106

[52] U.S. Cl................................. 356/219, 356/227
[51] Int. Cl.............................................. G01j 1/42
[58] Field of Search ...... 356/219, 227, 228; 313/54; 250/363, 365

[56] References Cited
UNITED STATES PATENTS

| | | | |
|---|---|---|---|
| 2,297,428 | 9/1942 | Nuchterlein | 356/219 |
| 3,005,102 | 10/1961 | MacHutchin et al. | 313/54 |
| 3,106,141 | 10/1963 | Estes | 356/219 |
| 3,536,408 | 10/1970 | Norwood | 356/219 |
| 3,566,125 | 2/1971 | Linhart, Jr. et al. | 313/54 |

*Primary Examiner*—Vincent P. McGraw
*Attorney, Agent, or Firm*—Krafft & Wells

[57] ABSTRACT

Light meter having coordinated indicating elements such as a pointer, a coupling pointer and/or scale in which a nuclear light source is provided, either alone or in combination with external light especially for use in cameras.

14 Claims, 5 Drawing Figures

Patented Dec. 24, 1974 3,856,416

LIGHT METER WITH NUCLEAR LIGHT SOURCE

BACKGROUND OF THE INVENTION

The invention concerns a light meter having coordinated indicating elements such as a pointer, a coupling pointer and/or numbered scale.

Photographic cameras with coupled light meters are known in which the pointer is coated with fluorescent paint in order to make it easier to see the pointer in the dark, thereby permitting reading and measuring light over the full range of sensitivity of the meter. It has been shown that the effectiveness of this coating is poor because of the short period after exposure to light in which the coating is visible and these narrow pointers emit a very small quantity of light.

It has been suggested to supply light meter indicators, scales and the like with a beam of artificial light in order to make them more visible under low light levels. This requires not only the provision of a battery but in addition a switch for the same. In addition to the difficulties of providing such elements in the photometer, the user must also think of turning the light on and off. This same difficulty also exists with those systems which employ a light beam in addition to the luminescent paint. (Federal Republic of Germany Utility Model No. 6,919,547)

SUMMARY OF THE INVENTION

It is an object of the present invention to provide an improvement over the above-noted prior art. For this purpose a nuclear light source such as the self powered light source which has the trademark (Betalight) which is disclosed in the publication "Betalight" and available from Merz&Benteli Nuclear AG, Bumplizstrasse 91, Bern, Switzerland, is coordinated with the scale and pointer of a photoelectric light meter in the direction counter to the viewing direction, or in cooperation from an outside light source.

Because only a small portion of the scale is used in measuring extremely weak light sources, the size and position of the Betalight must be such as to only light this small portion of the scale. It is also desirable in some cases to provide a special scale area for this portion of the scale to be lighted by the Betalight. Such modifications are especially advantageous when the light meter is built into and combined with the view finder. Such a modified camera is disclosed in the U.S. Pat. No. 3,332,330. The proportion of each scale is such that the pointers will be effective for both. Therefore, the periphery of the view finder can be expediently provided with a suitable area for the scale. One side of the scale illuminated by the nuclear light source will be masked at least from one side in order to designate the end of the scale. In one embodiment, the Betalight is fixed directly behind the view finder window in the direction of viewing. In the case where it should itself serve to limit the scale, the Betalight is located directly behind the pointer and coupling pointer. In still another embodiment, the Betalight beam is conducted to the scale by the use of a prism or mirror. Where it is desired to combine beams from external light and beams being emitted by the Betalight, a partially reflecting mirror is employed to direct the light beams to the scale. Instead of this mirror, a 90° prism of which the reflection side is concave, having the nuclear light source on the concave side of the prism near the edge opposite the scale, is used.

In a further modification of the invention, in a camera having a built-in light meter and coupling pointer, the Betalight is not only used to light the pointer but is additionally employed to light the numerical values connected with the coupled lens opening and shutter speed control.

BRIEF DESCRIPTION OF THE DRAWINGS

Preferred embodiments of the invention are shown in the drawings, wherein.

DESCRIPTION OF THE PREFERRED EMBODIMENTS

Figure 1:
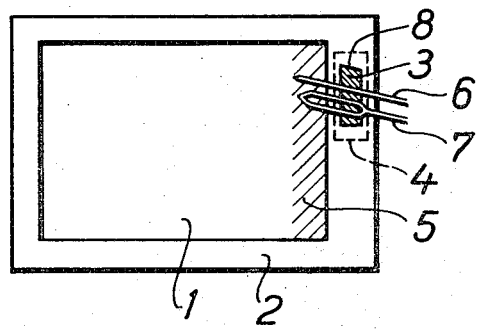
FIG. 1 shows the view finder of a camera having a coupled light meter in which the scale is supplemented by a special area for indicating extremely weak light reception.

FIG. 1 shows view finder 1 having front plate 2 behind which is an opening 3 seen from the viewer's position and behind which is a nuclear light source 4. This self-powered light source having the trademark (Betalight) consists of a closed glass tube filled with tritium having a phosphorescent coating on the inner wall of the closed glass tube. The electrons emitted from the tritium are absorbed by the phosphorescent layer which produces a substantial amount of light. The glass tube resists electron emission and produces a radioactive free source of light.

Figure 3:
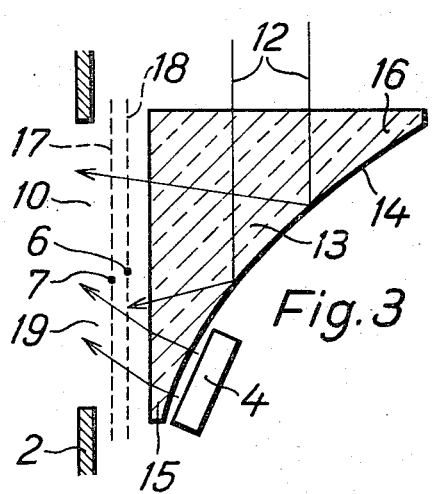
FIG. 3 shows in cross-section the radiation beam according to the device of FIG. 2.

In the vicinity of opening 3 of FIG. 3 of FIG. 1, scale 5 is represented by a hatching in front of which are pointer 6 and coupling pointer 7. The electrical and mechanical portions of the light meter are not illustrated but are disclosed in U.S. Pat. No. 3,427,946. Opening 3 is also positioned to coincide with respect to the operating range of both pointers. Its position is also such as to coincide with the low light range of the scale. The upper edge 8 of the scale shown through opening 3 serves to limit the measuring range of the meter.

Figure 2:
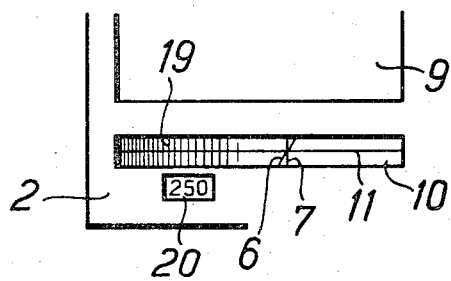
FIG. 2 shows a device similar to FIG. 1 in which the scale is separate from the view finder.

The modifications shown in FIGS. 2 and 3 have a scale 10 separate from view finder 9. FIG. 2 has an indicating line 11 in which pointer 6 and coupler pointer 7 can be indexed. For lighting the scale, external light may in part be used. As shown in FIG. 3, these rays 12 are bent by a 90° total reflection prism 13. The reflection surface 14 is concave forming two angles 15 and 16 of less than 45°. The light rays from Beta-light 4 penetrate the prism 13 and illuminate the scale 10 at the levels 17 and 18 to illuminate pointers 6 and 7. This light beam is shown in FIG. 2 by hatching 19.

The light from the nuclear light source is not visible when measuring high light value, only slightly when measuring medium light values, but strong especially in the low value area of the scale when measuring low value light. Window 20 shows light reception from both Betalight and natural light which is employed to illuminate the values shown on the scale for coupling the lens opening and shutter speed.

Figure 4:
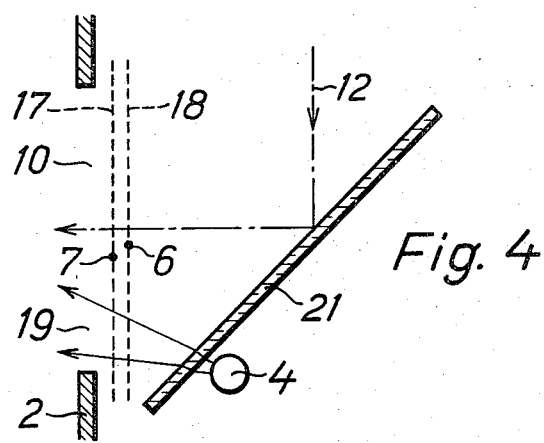
FIG. 4 shows another variation of the light beam, using a partially reflecting mirror.

The modification shown in FIG. 4 can be used with that of FIGS. 2 and 3 in which a partially reflecting mirror 21 is employed instead of prism 14. The range of the scale used for measuring weak light and lighted by the nuclear light source 4 is disposed at the lower portion of the mirror.

Figure 5:
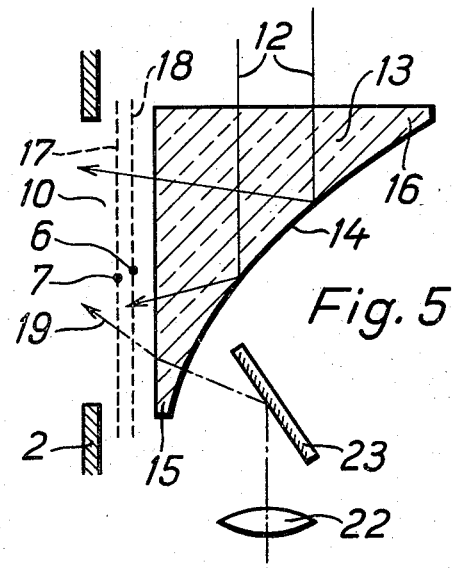
FIG. 5 shows a variation of the light beam of FIG. 3, using a reflecting mirror, lens and a prism.

As shown in FIG. 5 the beams 4a emitted by the nuclear light source 4 are sent through a collective lens 22 to a deflection mirror 23. According to FIG. 3 they penetrate prism 13 and illuminate scale 10 at the lower end.

We claim:

1. A light meter having coordinated indicating elements including a scale and means for pointing, a front plate disposed in front of said means for pointing, an aperture in the front plate for viewing said means for pointing, means for illuminating said indicating elements with external light and with a self-powered light source, said self-powered light source being disposed behind said means for pointing, said scale having a first section for measuring weak light and a second section for measuring higher light intensity, means for illuminating said first section with self-powered light source, and means for illuminating said second section with said external light.

2. The light meter of claim 1, wherein said self-powered light source is a closed glass tube having a phosphorescent coating on the inner wall and a tritium source within the glass tube for emitting electrons which are absorbed by the phosphorescent coating and produce light.

3. The light meter of claim 1, wherein said means for pointing cooperate with said first and second sections.

4. The light meter of claim 1, wherein said indicating elements include a transparent scale behind said front plate and in front of said means for pointing and said self-powered light source is positioned behind said means for pointing.

5. The light meter of claim 1, wherein said means for pointing include a pointer and a coupling pointer.

6. The light meter of claim 1, wherein said indicating elements comprise a window showing light reception from said self-powered light source and natural light which is employed to illuminate the values shown on the scale for coupling the lens opening and shutter speed.

7. The light meter of claim 1, wherein said scale is combined with the viewfinder of a camera.

8. The light meter of claim 1, wherein said second section is a part of said first section.

9. The light meter of claim 7, wherein said aperture includes a first portion for viewing said means for pointing and said scale, and a second portion for said viewfinder.

10. The light meter of claim 1, wherein said indicating elements include a transparent scale behind said front plate and said self-powered light is positioned behind said scale.

11. The light meter of claim 10, further comprising means for illuminating said scale with said self-powered light source.

12. The light meter of claim 11, wherein said means for illuminating comprise a partially reflecting mirror.

13. The light meter of claim 11, wherein said means for illuminating comprise a prism.

14. The light meter of claim 13, wherein said prism has a first side and a second side at an angle of 90° thereto, a concave surface extending between the ends of said sides and joining said ends at angles less than 45°, said outside light reflected by said concave surface and said self-powered light source located on the concave side and near the end opposite the scale.

* * * * *